E. V. ANDERSON.
PILOT VALVE.
APPLICATION FILED OCT. 18, 1911.
1,092,806.
Patented Apr. 7, 1914.
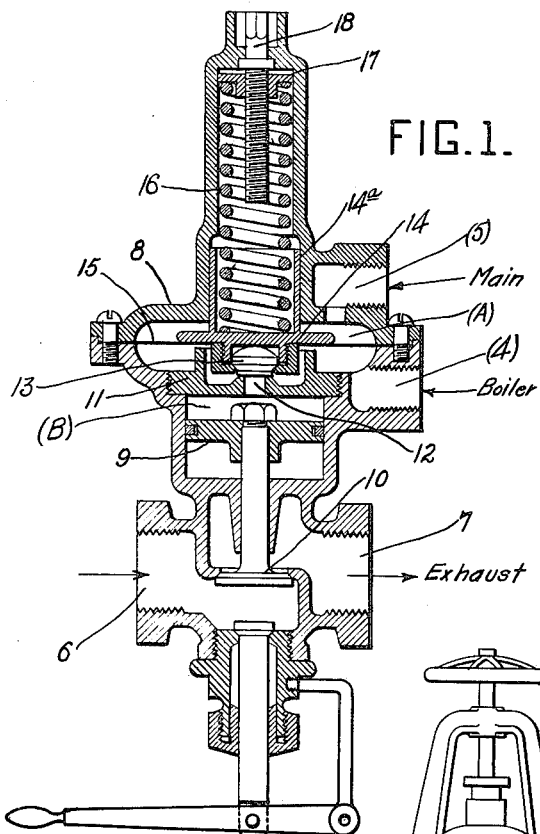
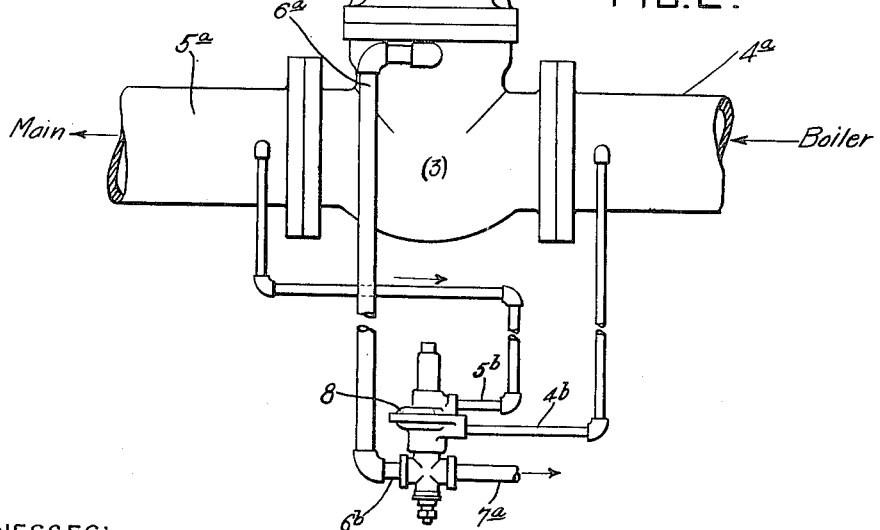
WITNESSES:
INVENTOR,
Edward V. Anderson
By F. W. H. Clay ATTY.

UNITED STATES PATENT OFFICE.

EDWARD V. ANDERSON, OF MONESSON, PENNSYLVANIA, ASSIGNOR OF ONE-HALF TO CHARLES E. GOLDEN, OF CRAFTON, PENNSYLVANIA.

PILOT-VALVE.

1,092,806.  Specification of Letters Patent.  Patented Apr. 7, 1914.

Application filed October 18, 1911. Serial No. 655,435.

*To all whom it may concern:*

Be it known that I, EDWARD V. ANDERSON, a citizen of the United States, residing at Monesson, in the State of Pennsylvania, have invented certain new and useful Improvements in Pilot-Valves, of which the following is a specification.

My invention relates to valves used for the purpose of handling other and larger valves, and its primary object is to provide a device which automatically opens and exhausts the pressure of other apparatus when abnormal conditions occur, being particularly designed as a safety device to close off the boiler pressure from a steam header when the latter develops a break or leak.

I have illustrated the invention in the form of a pilot valve for governing another and larger valve which is operated by exhausting the pressure, in any of the well known ways.

Figure 1 is a vertical cross-section of the differential pilot valve and Fig. 2 shows its application to the government of what is commonly called a triple-valve, used in steam lines.

There are in use many forms of valves which are opened or closed by the opening of an exhaust port when certain desired conditions arise in the relation between pressures on the two sides of the valves. It makes no difference to my invention what may be the object of relieving the pressure.

The invention resides in the provision of an automatic and adjustable differential pilot valve, whose function is to exhaust the pressure from another device under certain previously determined conditions. For example, I have shown in Fig. 2 a main valve 3 which leads from a pipe 4ª from the boiler to a pipe 5ª going to the steam line, and this main valve is operated for certain purposes by exhausting pressure from some part of its chambers by means of a pipe 6ª having a final outlet at 7.

8 represents the casing of a pilot valve for controlling this outlet and it is shown in detail in Fig. 1.

In Fig. 1, the casing 8 contains an operating piston 9 having a leakage around it, and in turn moving a valve 10 which opens a port 6 to communicate with an exhaust port 7. In the casing above the piston 9 is set a diaphragm 11 having a port 12 governed by a valve 13. This valve 13 is held loosely as by a screw ring, on the bottom of a plunger whose head 14 is attached to a flexible diaphragm 15 which divides the chamber A into two parts. The piston 14ª is hollow and contains a spring 16 which is adjustable by means of a traveling head 17 carried on a screw 18 in the top of the valve casing 8. On the upper side of the diaphragm 15, the port 5 connects with the pipe 5ᵇ shown in Fig. 2, coming from the steam main; and on the underside of the diaphragm 15 a port 4 connects with the pipe 4ᵇ in Fig. 2 coming from the boiler.

It will be seen that the small valve 13 is normally closed under the pressure of the spring 16 and the pressure from the port 5, and is in part counterbalanced by pressure from the port 4 from the boiler; and that when the difference between the boiler pressure and the pressure in the main reaches a desired limit, (adjustable by means of the screw 18), the small valve 13 will be opened and the boiler pressure escaping through port 12 will act on the piston 9 and open the valve 10, allowing escape of pressure from the triple-valve by way of the pipe 6ª, 6ᵇ.

This pilot valve can be located at any convenient point and can be adjusted at will and gives a very efficient governor for any other valve acting by escape of pressure. The advantages of the device will be obvious to those familiar with the art. For example an opening of the valve is independent of the actual boiler pressure and of the actual fluctuations in boiler pressure, being operated only by a predetermined difference of pressure between the boiler and the main. And, moreover, this limiting difference of pressure may be actually adjusted.

Having thus described my invention and its use, what I claim is the following:

1. An automatic pilot valve for main steam valves comprising a casing having a normally closed exhaust port, a device to open said exhaust port by admission of high pressure from the steam main and means to prevent said admission of high pressure controlled by the difference of pressure between the inlet and outlet sides of the main steam valve.

2. An automatic differential pilot valve, comprising a casing having an exhaust passage adapted to be connected for operating another valve, a valve in said passage, a piston chamber and a piston therein connected with the stem of the valve, a diaphragm chamber and a diaphragm dividing it, a port between the piston chamber and the underside of the diaphragm chamber, a check valve loosely carried by said diaphragm and adapted to normally close said port, ports on the respective sides of the diaphragm adapted to connect the underside and the upperside of the diaphragm chamber, respectively to the high pressure and low pressure sides of the valve to be governed and a spring to regulate the movements of the diaphragm and therefore the admission of high pressure to the valve operating piston, whereby said piston operates the valve to open the exhaust when a predetermined and regulable difference occurs between the high pressure and low pressure sides of the valve to be governed by the pilot.

In testimony whereof I have hereunto signed my name in the presence of the two subscribed witnesses.

EDWARD V. ANDERSON.

Witnesses:
FREDK. STAUB,
JO. BAILY BROWN.